United States Patent
Kopmeier

(10) Patent No.: US 7,985,334 B2
(45) Date of Patent: Jul. 26, 2011

(54) DEVICE FOR THICKENING SLUDGE CARRIED ALONG IN WASTE WATER

(75) Inventor: Achim Kopmeier, Junglinster (LU)

(73) Assignee: Epuramat S.A.R.L., Esch/Alzette (LU)

( * ) Notice: Subject to any disclaimer, the term of this patent is extended or adjusted under 35 U.S.C. 154(b) by 306 days.

(21) Appl. No.: 12/092,334

(22) PCT Filed: Nov. 3, 2006

(86) PCT No.: PCT/EP2006/010574
§ 371 (c)(1),
(2), (4) Date: Nov. 21, 2008

(87) PCT Pub. No.: WO2007/051640
PCT Pub. Date: May 10, 2007

(65) Prior Publication Data
US 2009/0078650 A1    Mar. 26, 2009

(30) Foreign Application Priority Data

Nov. 4, 2005   (DE) .......................... 10 2005 053 151

(51) Int. Cl.
*C02F 1/52* (2006.01)

(52) U.S. Cl. ....... 210/96.1; 210/207; 210/295; 210/519; 210/521

(58) Field of Classification Search .................... 210/519
See application file for complete search history.

(56) References Cited

U.S. PATENT DOCUMENTS

| | | | | | |
|---|---|---|---|---|---|
| 1,020,013 | A | * | 3/1912 | Arbuckle | 210/521 |
| 1,344,370 | A | * | 6/1920 | Allen | 210/85 |
| 2,257,362 | A | * | 9/1941 | Zitkowski | 210/198.1 |
| 2,429,316 | A | * | 10/1947 | Green | 210/713 |
| 3,227,278 | A | * | 1/1966 | Johnson | 210/101 |
| 3,617,544 | A | * | 11/1971 | Voss et al. | 210/739 |
| 3,635,346 | A | * | 1/1972 | Zuckerman et al. | 210/208 |
| 3,684,092 | A | * | 8/1972 | Busse et al. | 210/768 |
| 3,779,910 | A | * | 12/1973 | Chatfield | 210/712 |
| 3,862,033 | A | | 1/1975 | Rozkydalek | |
| 3,923,652 | A | * | 12/1975 | Condolios et al. | 210/738 |

(Continued)

FOREIGN PATENT DOCUMENTS

BE    0157562    3/1985

(Continued)

OTHER PUBLICATIONS

International Search Report for PCT/EP2006/010574 dated Jan. 22, 2007.

(Continued)

*Primary Examiner* — Peter A Hruskoci
(74) *Attorney, Agent, or Firm* — Bill C. Panagos; Rader, Fishman & Grauer PLLC

(57) ABSTRACT

In one embodiment, the present invention relates to a method for thickening sludge carried along in waste water, wherein the waste water is subjected to a pretreatment reinforcing the flocculation and is subsequently introduced in the direction of gravity into a bath so as to separate the sludge from the water, in which the sludge particles descend under the action of gravity and are removed in the lower portion of the bath characterized in that the waste water, upon its introduction into the bath, is flowed against a baffle, by which the flow of the waste water in the bath is deflected.

8 Claims, 1 Drawing Sheet

U.S. PATENT DOCUMENTS 4,490,251 A * 12/1984 Quintana et al. ............... 210/209
5,601,704 A *  2/1997 Salem et al. .................... 210/86
5,716,519 A *  2/1998 Schleife et al. ............... 210/206

FOREIGN PATENT DOCUMENTS

| DE | 3626484 | | 2/1988 |
| DE | 4125453 | | 2/1993 |
| DE | 4301825 | A1 | 7/1994 |
| DE | 4426052 | | 1/1996 |
| EP | 1090681 | | 4/2001 |

OTHER PUBLICATIONS

Solid-liquid Separation; by Yang Shouzhi et al., Metallurgical Industry Press; May 31, 2003; 6 pages.

Translation of Notification of the First Office Action (National phase of PCT Application); Oct. 12, 2010; 8 pages.

* cited by examiner

DEVICE FOR THICKENING SLUDGE CARRIED ALONG IN WASTE WATER

TECHNICAL FIELD OF THE INVENTION

The present invention relates to a method for thickening sludge carried along in waste water and to a device suitable for performing the method.

The present invention relates to the treatment of sludge-carrying waste waters, which may also be regarded as suspensions. The solids contained in the suspension are sludge particles. During the waste water treatment, these solid constituents are to be separated from the water. Especially in downcoming configurations, in which the solid particles have a density slightly higher than, but close to the density of water, the separation of the sludge particles under the action of gravity involves greater difficulties. To achieve a waste water treatment as economical as possible, the sludge particles in a bath should be sedimented as fast as possible and removed continuously or batch-wise, while the water freed from the sludge particles should ascend in the bath to be discharged continuously. The aim is to separate the sedimented solids from the liquid as completely as possible in order to reuse the liquid in the cycle in a purified state or introduce it into the public sewerage system in the permissible quality. Previously, it was assumed that, with a given equipment and a given throughput, the sedimentation speed of the solid particles under laminar conditions constitutes the decisive process parameter that influences the size of the waste water treatment system. Despite the use of highly molecular reagents as auxiliary flocculating agents, which are added to the waste water prior to introducing it into the bath, sedimentation systems used for separating solid particles of the sludge can therefore only be employed to a limited extent.

BACKGROUND OF THE INVENTION

A prior sedimentation system comprising the features of the preamble of the independent device claim is known from DE 44 26 052. This prior device has a rotationally symmetric container comprising an upper cylindrical section and a funnel-shaped section situated below. At the lower end of the funnel-shaped section there is provided a discharge outlet for the removal of sludge which has accumulated in the lower portion of the funnel-shaped section. A pipe is concentrically disposed in the container, which initially tapers downwardly in order to then widen towards the container in the form of a frusto-conical hood. The pipe is vertically slidable with respect to the container, so that the area ratio of the waste water inlet opening formed by the free end of the funnel-shaped hood can be altered with respect to the annular area disposed outside thereof in a radial direction for receiving the ascending flow, provided that the inlet opening is displaced in the area of the funnel-shaped section. By this alteration, the flow conditions are to be adjusted in such a way that the sludge particles descend as fast as possible and the water partly freed from the sludge particles ascends in the container under flow conditions which are favorable for the ongoing separation process, so that residual, usually smaller sludge particles can descend from this ascending flow.

SUMMARY OF THE INVENTION

Based on this prior art, the present invention provides a method and a device for thickening sludge carried along in waste water with an increased performance.

To solve this problem by, the present invention proposes at least one method for thickening sludge carried along in waste water. The waste water is first subjected in a manner known per se to a pretreatment supporting the flocculation of the sludge, for example, by adding an auxiliary flocculating agent known per se to the waste water. To separate the sludge from the water, the so pretreated waste water is introduced in the direction of gravity into a bath, in which sludge particles descend under the action of gravity and are removed from the lower region thereof. This removal of the sludge particles may be performed continuously or batch-wise. The special feature of the method according to the invention resides in that the waste water, upon its introduction into the bath, is flowed against a baffle, by which the flow in the bath is deflected. By this process control a hydraulic-physical reaction zone is generated in the region of the inlet opening, in which at least the predominant flow energy of the waste water flowing in the direction of gravity is destroyed. Deflecting the sludge flow flowing into the soil pipe in a vertical direction favors the separation of the solid particles due to the density differences over the water. On deflecting the waste water, the heavier sludge particles have a greater tendency to continue their path of motion in the direction of the soil pipe, i.e. in the downward direction, while the water is deflected and, separated from the heavy solid particles, ascends. The destruction of the flow energy is substantially caused by the deflection losses when flowing against the baffle, i.e. in the flow direction of the waste water flowing through the soil pipe on and predominantly after exiting the soil pipe downstream of the baffle. According to the invention the waste water is particularly deflected in such a way that sludge particles, i.e. particles having a higher density than the water, which, in the generic method, are to descend within the container, continue their descending motion initiated by the soil pipe during the introduction into the bath in a substantially undisturbed manner. The deflection should not have the result that the particles having a higher density, that is, the sludge particles, have an upwardly directed speed component imposed on them during the deflection. Such a speed component should solely be imposed on the lighter water during the deflection, so that, as a result of the deflection at the baffle, the water receives the desired speed component for ascending in the bath.

The separating motion of the solid particles from the waste water is particularly supported if the waste water is introduced into the bath subject to turbulent flow conditions. The relevant point of introduction is located at the position at which the waste water flow falling through the soil pipe is introduced into the bath. The point of introduction thus coincides with the inlet opening of the soil pipe. Moreover, it is preferred to choose a residual area between this inlet opening of the soil pipe and the inner circumferential surface of the container in such a way that the ascending flow passing the point of introduction flows in a laminar manner. To configure the container in consideration of the Reynolds number for adjusting turbulent flow conditions at the point of introduction under laminar flow conditions of the ascending flow has proved to be particularly effective for the best possible separation of the solid particles from the waste water. Preferably, the Reynolds number should be higher than 5000, preferably higher than 10000, at the outlet point, while the ascending flow should preferably pass the point of introduction at a Reynolds number of not higher than 2000.

To achieve an effective separation, it has proved to be expedient to choose the ratio of the flow speed of the introduced waste water with respect to the flow speed of the ascending flow in an adequate manner. The speed of the descending flow in the soil pipe should be at least 120, preferably 150 times greater than the speed of the ascending flow. The decisive reference point for the flow speed in the soil pipe is above the point of introduction, i.e. in the longitudinal section in which the soil pipe has a cylindrical shape. For the ascending flow, the flow conditions at the same height are of relevance, namely through the annular residual area between the outer circumferential surface of the soil pipe and the inner circumferential surface of the container. As the method according to the invention is usually performed without a pump and the flow falls into the container as a result of gravity alone, it is possible to vary the volume flow of the introduced waste water and thus the flow speeds in the soil pipe, on the one hand, and the annular area, on the other hand, by altering the flow conditions at the point of introduction, especially by altering the cross-sectional area at the point of introduction. Due to the substantially existing continuity of the flowing water, the above-indicated ratio of the flow speeds corresponds to the area ratio of residual area to the cross-sectional area of the soil pipe. In this case, too, the point of introduction is relevant, i.e. the cross-sectional area at the outlet point of the soil pipe, on the one hand, and the residual area at the height of the point of introduction which is surrounded by the inner wall of the container and reduced by this central area. Due to the substantially existing continuity of the flowing water, the ratio of the flow speeds corresponds to the area ratio of residual area to inlet opening.

Last but not least with respect to the baffle and the geometric design thereof should the inlet opening of the soil pipe be constructed in such a way that the waste water is introduced into the bath in a directed stream, which has a vertical and a horizontal speed component. Over the entire surface of the inlet openings flows solely having a vertical speed component should be prevented, such as the central part of the waste water flow introduced into the bath through the soil pipe according to DE 44 26 052. By correspondingly configuring the baffle and/or the wall of the soil pipe leading to the inlet opening a substantial horizontal flow component of the directed stream should be generated. Particularly a speed component of the stream is considered as a substantial horizontal speed component, which amounts to at least 30%, preferably 40% of the vertical speed component.

With respect to the device-related problem, the present invention provides at least one device to achieve separation of solid particles from waste water. In one embodiment, the device comprises a baffle arranged in the region of the inlet opening, by which the waste water flow is deflected. In the device according to the invention, the waste water flow is initially introduced through the soil pipe in the gravity direction in the direction of the bath. At the end of this soil pipe there is provided the inlet opening, at which the waste water flow, which is at first circumferentially enclosed by the soil pipe, is introduced into the bath. According to the invention, the baffle is provided in the region of this inlet opening, by which baffle the waste water flow is deflected, i.e. which deflects the waste water flow to an irrelevant extent in the horizontal direction. It should be noted that, to a certain extent, a vertical speed component can already be imposed on the waste water flow just in front of the inlet opening by a configuration of the soil pipe which deviates from the cylindrical tubular shape. Nevertheless, the waste water flow circumferentially surrounded and guided by the soil pipe should also predominantly flow in a vertical direction just in front of the inlet opening. This substantially vertical flow is deflected in the region of the baffle into a flow having a significant horizontal speed component. The lower end of the soil pipe is arranged with a considerable distance to the upper surface of the bath. In other words, the soil pipe is located with a considerable axial extension within the bath and is immersed in the same.

A baffle in accordance with the invention is preferably any object having a suitable baffle surface to deflect the waste water flow in the aforementioned sense. The baffle is preferably formed to encourage the formation of a substantially curve-shaped flow profile downstream of the inlet opening, by which the flow speed of the waste water is deflected by 180° from an orientation directed downwardly in a vertical direction so as to ascend inside the container to be discharged at the upper edge thereof as water freed from sludge particles. The arc-shaped acceleration of the water cannot identically be realized by the sludge particles due to their slightly higher density, so that these sludge particles rather descend inside the container in the gravity direction to accumulate in the lower portion thereof.

If the soil pipe is disposed concentrically in a cylindrically shaped container, the curve-shaped motion immediately adjacent to the inlet opening will develop a relatively strong radius and the radially outer part of this curve-shaped motion will develop a relatively large radius. This fact can be utilized to selectively adjust in the soil pipe an inhomogeneous density distribution of the sludge in the waste water, so that the waste water with the sludge particles of a higher density and/or size are guided in the inner curve, where they are separated from the water more strongly because of the higher acceleration values prevailing therein, whereas the finer or lighter sludge particles are entrained by the water deflected in the outer curve. Thus, it is possible to support the fast separation of the sludge particles. Suited methods for adjusting an inhomogeneous density distribution within the waste water flow will preferably be separating methods making use of the different density properties of the sludge particles in centrifuges. One example for such a method is described in DE 39 43 416.

According to a preferred further development the soil pipe is guided in a longitudinally slidable manner with respect to the container and can be fixed with respect to the same, so that the position of the inlet opening can be adjusted inside the container.

This allows, on the one hand, to adjust the area ratio between the area at the point of introduction, i.e. the inlet opening formed by the soil pipe, and the residual area located outside this inlet opening and extending to the inner wall of the container, if the soil pipe with its inlet opening is displaced within the conical section of the container. In a preferred rotationally symmetric configuration of the container the residual area is a ring area.

On the other hand, the longitudinal displaceability allows to vary the pressure at the point of introduction, i.e. at the inlet opening of the soil pipe. To this end, the soil pipe is preferably longitudinally displaceable in such a manner that the inlet opening is longitudinally displaceable within a longitudinal range along the longitudinal axis of the container above the funnel-shaped section. It has proved to be useful to use this pressure at the point of introduction alone for controlling the flow speed of the waste water flowing in the soil pipe. As the device according to the invention is particularly suitable for small sewage treatment plants, the operating staff of which only have little knowledge of fluid engineering, it has proved to be advantageous to adjust the longitudinal displaceability of the soil pipe such that the inlet opening cannot be displaced into the funnel-shaped section. To this end, for example, a stop is provided which defines the lowermost position of the soil pipe inside the container. By this simple measure it is prevented that, by introducing the inlet opening into the funnel-shaped section, the area ratio of the inlet opening with respect to the residual area is varied, which may result in enormously influencing the flow and sedimentation conditions in the container, the consequences of which can no longer be assessed by untrained staff. Small sewage treatment plants in the aforementioned sense are, according to the relevant worksheet ATV-A122 of the ATV (association for waste water technology), sewage treatment plants having a capacity of 50 to 500 population equivalents.

According to another preferred embodiment of the present invention the device comprises a guiding member which guides the longitudinally displaceable motion of the soil pipe and is arranged in the soil pipe. Between this guiding member, which is preferably provided as a rod-shaped element inside the soil pipe, and the inner circumferential surface of the soil pipe there are provided several spacer elements holding the soil pipe in a predetermined manner relative to the guiding member. The conceived guiding member is especially one that has spacer elements extending in the radial direction, each permitting between them a flow passage in the circumferential direction. These spacer elements serve to guide the displacing motion of the soil pipe relative to the guiding member and hold both in a predetermined radial position to one another. By appropriately stiffening and/or mounting the guiding member on the device other supporting measures for the soil pipe inside the container can be waived. The soil pipe is fixed in the container in a vibration-free manner and at a predetermined position, preferably by the guiding member alone in the radial direction of the soil pipe. The spacer elements may be made of an elastic, vibration-dampening material so as to dampen or avoid the vibrations of the soil pipe inside the container caused by the flow conditions.

According to a preferred embodiment of the present invention the guiding member guiding the displacing motion of the soil pipe is designed as a guide pipe, the lower end of which extends into the lower portion of the funnel-shaped section, where, specifically, another support for the guiding member with respect to the container may be provided which, in addition to another support arranged outside the container and/or above the same, is able to fix the guiding member in a predetermined longitudinal extension inside the container with great accuracy. Moreover, the construction of the guiding member as guide pipe makes it possible to detach, by blowing in air and/or introducing water, a hardened sediment of sludge particles which cannot be removed at the lower end of the funnel-shaped section through the removal opening. To support the guide pipe in the lower portion of the container, a guide pipe guide should be disposed in the lower portion of the container, which is supported against the inner wall of the container, but simultaneously allows sludge particles to pass therethrough into a portion of the container disposed underneath for the removal through the removal opening.

Last but not least for the adjustment of the flow speed and/or the flow orientation at the point of introduction is it proposed according to another preferred embodiment of the present invention to arrange the baffle in a longitudinally displaceable manner with respect to the soil pipe. Such a configuration is usefully realized by the guiding member carrying the baffle and being longitudinally displaceable with respect to the container and the soil pipe. Moreover, the guiding member should be fixable with respect to the soil pipe so as to fix a once found operating position of the baffle relative to the inlet opening. It goes without saying that a scale should be provided outside the container, by means of which a once found operating position of the baffle can be readjusted relative to the inlet opening.

At the lower end of the funnel-shaped section there is preferably provided a reservoir including the removal opening, which holds the separated sludge particles. Especially in case of a batch-wise removal through the removal opening these may be stored temporarily in the reservoir. For the control of the removal process a probe is preferably assigned to the reservoir, which serves to determine the quantity of separated sludge particles. For example, this may be a probe determining the optical density of the sludge located in the reservoir.

Last but not least because of the guiding member is it possible to provide the container with a smooth continuous container inner wall. This means that no holders and/or supports for the soil pipe are provided between the soil pipe and the container inner wall surrounding the same. The flow of the waste water increasingly freed from the sludge particles ascending in the container can, thus, ascend in the container unobstructedly and, if the flow is uniformly laminar and undisturbed, separate additional fine sludge particles in a best possible manner. It cannot be excluded that, due to surface effects, finest colloidal particles are entrained with this ascending flow, which stick to the inner wall of the container. Hence, the present invention further proposes to provide on the upper end of the container inner wall an inwardly projecting collar, which prevents an entrainment of these finest sludge particles by the upwardly streaming water carried out of the container at an overflow. The overflow preferably comprises in a manner known per se on the entire circumference of the container inner wall permeable at this point a filter leading to a ring channel, which surrounds the filter and opens into a discharge pipe for the water freed from sludge particles.

The baffle is preferably formed as a spherical body having a convex surface. At its lower end, the soil pipe may be conically widened with the aim to horizontally deflect the falling waste water flow in the region of the inlet opening. Specifically conceived is a conical widening of the lower end of the soil pipe. Tulip-shaped or trumpet-shaped embodiments, respectively, are preferred. In the case of a trumpet-shaped embodiment the conical widening has a substantially continuous or continuously changing radius, while in the case of a tulip shape the inner circumferential surface of the conical widening immediately adjacent to the soil pipe is first concave, then substantially straight and adjacent to this convex in the region of the inlet opening of the pipe. The baffle should have a contour corresponding thereto, which specifically means that, due to the contour of the baffle and the contour of the lower end of the soil pipe, a flow cross-section being constant or changing with uniform continuity in the flow direction, respectively, is formed even if a positional adjustment of the baffle with respect to the soil pipe is performed, which flow cross-section is favorable for the deflection of the flow at the baffle from a substantially vertical flow to a substantially horizontal flow.

Further details and advantages of the present invention can be inferred from the following description of an embodiment in combination with the drawing. It shows a longitudinal sectional view of a device according to the invention. The drawing shows a schematic sectional view through an embodiment of a device according to the invention.

DETAILED DESCRIPTION OF THE PREFERRED EMBODIMENT(S)

Figure 1:
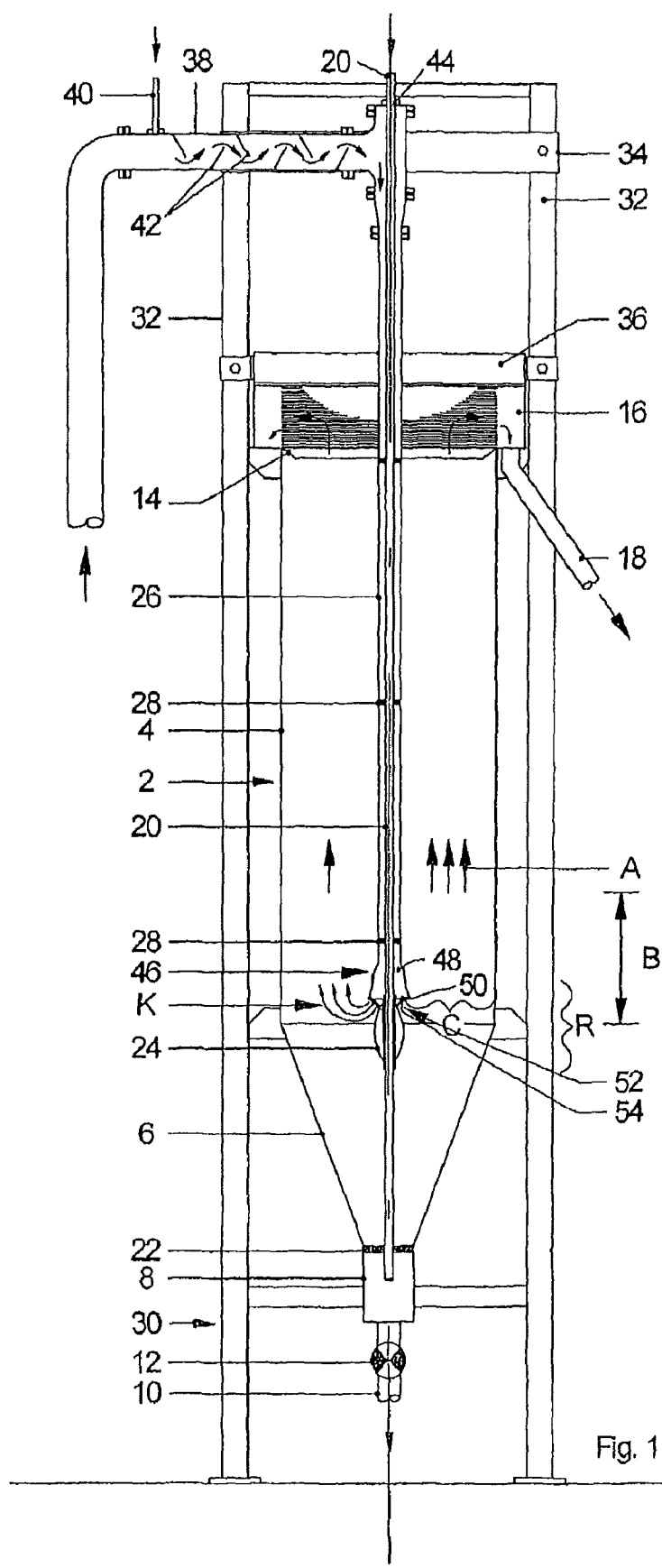
FIG. 1 is a schematic representation of a device for thickening sludge entrained in waste water according to one embodiment of the described invention.

The drawing shows a schematic sectional view through an embodiment of a device for thickening sludge carried along in waste water, which has a container 2 comprising an upper cylindrical section 4 and a funnel-shaped section 6 below the same. In the embodiment as shown, the container 2 has a rotationally symmetric basic shape and includes on its lower end adjacent to the funnel-shaped section 6 a reservoir 8 which is formed by a cylindrical section. The bottom of this cylindrical reservoir 8 is sealed and provided with an discharge pipe 10, which may be opened and closed by a valve 12.

In the upper end portion of the cylindrical section 4 there is provided a collar 14 inwardly projecting from the inner wall of the container 2 and directed slightly downwardly. Above the collar 14 the wall of the cylindrical section 4 is surrounded by a ring channel 16. The inner wall of the ring channel 16, which is formed by the container wall of the cylindrical section 4, is constructed in a filter-type manner and allows the passage of clear water while restraining residual sludge particles. The ring channel 16 is connected to an outlet pipe 18 for discharging the purified water. On the filter provided in the upper portion of the cylindrical section 4 there may be provided in a manner known per se a backwashing device and/or cleaning device, e.g. a scraper circulating in the circumferential direction scraping off particles sticking to the filter from inside.

A guide pipe 20 is passed through the container 2 over nearly the entirely length thereof. This guide pipe 20 is fixed around its circumference in the radial direction by a guide pipe guide 22 arranged at the junction between the funnel-shaped section 6 and the reservoir 8. The guide pipe guide 22 allows a slidable support of the guide pipe 20. Accordingly, the guide pipe 20 can be displaced in an axial direction with respect to the guide pipe guide 22. Approximately at the height of the junction between the funnel-shaped section 6 and the cylindrical section 4 the guide pipe carries a baffle 24, which is likewise constructed as a rotationally symmetric component and shows in the longitudinal sectional view a convex surface. Above the baffle 24, the guide pipe 20 opens into a soil pipe 26. Between the guide pipe 20 and the soil pipe 26 spacers 28 are provided with an axial spacing between each other. Each of the spacers 28 permits that the guide pipe be slidably guided relative to the soil pipe 26. The spacers 28 may be fixed to the guide pipe 20 or to the soil pipe 26. The spacers 28 are formed of several radial webs arranged in the circumferential direction with a spacing between them, leaving between them a free space so as to allow a flow flowing through the soil pipe 26 to pass through the spacers 28 substantially undisturbed. With respect to the flow conditions desired in the soil pipe, the spacers and especially the webs of the spacers can be embodied in an optimized manner. Thus, the turbulent flow in the soil pipe 26 and thereby the formation of floccules can be favored by a corresponding configuration.

The container 2 is held by a rack 30 which, on the upper side, rises above the container 2. Between two opposite supports 32 of the rack 30 there extends a crossbar 34, which carries the soil pipe 26 and which is vertically slidable relative to the supports 32. The container 2 moreover comprises an upper side cover 36 through which the soil pipe 26 is passed. This is where sealing means are provided, by means of which the container 2 is sealed in a gasproof manner even at the point where the soil pipe 26 passes through the cover 36, and which permit a slidability of the soil pipe 26 relative to the container 2. The cover 36 is constructed as a vertically slidable lid which is guided on the supports 32, which seals the container 2 hermetically and includes a non-illustrated air vent serving the offtake of biogases for the storage and/or controlled combustion of the same. At the height of the crossbar 34 a lateral inlet pipe 38 branches off the soil pipe 26, at the front end of which an inlet duct 40 for auxiliary flocculating agents is provided, and which comprises thereafter flow barriers 42 ensuring that the auxiliary flocculating agent and a waste water carried in the inlet pipe 38 are mixed well.

The upper end of the soil pipe 26 is sealed as well and is passed through by the guide pipe 20, which rises above the soil pipe 26 on the upper side. The free upper end of the guide pipe 20 has a non-illustrated gasproof connection through which a gaseous medium can be introduced into the guide pipe 20. The guide pipe 20 abuts the upper cover of the soil pipe 26 with a stop 44. This stop 44 may be displaced with respect to the guide pipe 20 along a scale provided on the guide pipe 20. By means of this sliding movement the guide pipe 20 together with the baffle 24 is displaced with respect to the soil pipe 26.

The soil pipe 26 is conically widened at its lower end. In the embodiment as illustrated this widening 46 is tulip-shaped, whereby the inner wall of the soil pipe 26 first widens concavely outwardly. Adjacent thereto it forms a central bell-shaped section 48, which is substantially straight, predominantly slightly outwardly inclined, and adjacent thereto it forms a bell-shaped edge 50 curved outwardly in a convex manner. The lowermost end of this bell-shaped edge 50 comprises an inlet opening 52 for the waste water flow falling through the soil pipe 26.

The cross-sectional area of the inlet opening 52 can be altered. The maximum area of the inlet opening is calculated from the difference between the circle area enclosed by the bell-shaped edge 50 and the outer circumferential surface of the guide pipe 20. In the relative position of the soil pipe 26 with respect to the guide pipe 20 as shown in the drawing, the upper part of the baffle 24 is located inside the widening 46 so that, in this position, the area of the inlet opening is reduced by the circumference of the baffle 24 at the point of introduction 54. The point of introduction 54 for the waste water flow falling through the soil pipe 26 is located in the inlet opening 52. The area thereof is, in turn, located within the shortest connection between the bell-shaped edge 50 and the upper surface of the baffle 24 and, thus, diagonal to the axis of the soil pipe 26. Downstream of the inlet opening 52 the baffle 24 forms, in the position as shown in the drawing, a convex baffle and guide surface, which deflects the falling waste water flow radially outwardly. It is pointed out that the geometry of the baffle 24 is not limited to the illustrated embodiment. The baffle 24 may also be configured to have a trumpet shape with a contour corresponding to the widening 46.

If the baffle 24 is pushed into the widening 46 of the soil pipe 26 more deeply, a further reduction of the outlet area of the inlet opening 52 is achieved. In the illustrated embodiment, as a result of the corresponding configuration of the widening 46 and the baffle 24, an annular flow channel having a substantially constant width may be provided inside the widening 46 at the front end of the soil pipe 26, at the end of which the inlet opening 52 is located.

During the operation of the illustrated embodiment waste water is introduced through the inlet pipe 38 and is mixed with the auxiliary flocculating agent introduced through the inlet duct 40 within the region of the static mixer formed by the flow barriers 42. The so pretreated waste water then falls in the direction of gravity through the soil pipe 26 downwardly and in the direction of a bath provided in the container 2. In the filled operating state, the water quality of this bath in the upper portion of the container 2 is substantially clear. The water freed from the sludge particles flows through the filter into the ring channel 16. The particle density increases with an increasing distance from the upper surface of the bath. Finest sludge particles are, at first, entrained by the flow ascending in the container 2, which is marked with the arrow A. These finest sludge particles descend. Possibly, they settle down on the inner circumferential surface of the container 2 in the cylindrical section 4 thereof. The reservoir 8 accumulates the separated sludge particles. The sludge therein is strongly thickened. Above the reservoir and in the funnel-shaped section 6 of the container 2 relatively heavy sludge particles settle at a relatively high settling speed.

By adjusting the height of the soil pipe 26 inside the container 2, the pressure at the point of introduction 54 and, thus, during the operation of the device preferably without a pump, the flow speed of the falling waste water flow can be influenced. By displacing the baffle 24 together with the guide pipe 20 relative to the soil pipe 26, moreover, the cross-sectional area of the inlet opening 52 can be altered. These two adjustment mechanisms permit a best possible adjustment of the flow conditions prevailing in the container 2 to the sedimentation behavior of the sludge particles subject to the density and size thereof.

On introducing the waste water flow falling through the soil pipe 26 this waste water flow is, due to the configuration of the widening 46 and the arrangement of the baffle 24, deflected outwardly in the radial direction and a curve-shaped manner (at K). Already inside the widening 46 is the falling waste water flow as a whole subjected to a slightly radial speed component until the point of introduction 54. Downstream of the point of introduction 54 a deflection of the falling waste water flow is performed. The heavier sludge particles are unable to follow this acceleration in the way the lighter water can and, therefore, substantially maintain the descending motion produced in the soil pipe 26. This results in a very good separation of relatively heavy sludge particles. Moreover, in the region of the inlet opening, turbulent flow conditions are produced, which support a separation of solid particles from the water. The flow energy of the falling waste water flow is substantially destroyed in a hydraulic-physical reaction zone R, which begins in the region of the point of introduction 54. This hydraulic-physical reaction zone R has a certain axial extension which, relative to the total length of the container 2, is small, however. Downstream of this reaction zone R water ascends in the ascending flow A, which entrains smallest sludge particles or those sludge particles, respectively, the density of which is only insignificantly higher than that of the water. The ascending flow A passes through an annular gap C between the bell-shaped edge 50 and the wall of the container 2 under nearly laminar conditions already, which support a settling also of these light and small sludge particles from the ascending flow A. In front of the wall of the container a settling zone B is created, in which the heavier particles carried outwardly as a result of the centrifugal force substantially generated by the baffle precipitate after a strong negative acceleration and descend into the funnel-shaped section 6. Laminar is substantially the flow in the annular gap C. In the settling zone B extending downstream of the annular gap C the ascending flow is orientated coaxially with respect to the soil pipe 26. The settling zone B is located inside the cylindrical section 4 and defines moreover approximately also the region within which the point of introduction 54 can be altered with respect to its height by displacing the soil pipe 26. All sludge particles are accumulated in the funnel-shaped section 6, slip down to the inner circumferential wall thereof, and are finally accumulated in the reservoir 8.

Therein, a non-illustrated sensor monitors the density of the sediment and controls a batch-wise discharge of the sediment through the discharge pipe 10 by opening the valve 12. To this end, a suction pump may be activated, which is connected to the discharge pipe 10.

If the sediment has become solid in the region of the reservoir 8, air or water can be blown into the reservoir 8 through the guide pipe 20 so as to remove the solidification of the sediment in order to allow a discharge of the sediment through the discharge pipe 10. Also, it is possible to introduce a liquid through the guide pipe 20 into the bath to compensate for possibly undesired disturbances of the reaction zone R within the container, which may result during the removal of the sludge from the reservoir 8.

The invention claimed is:

1. A device for thickening sludge carried along in waste water, comprising:
    a container having an upper portion including a ring channel constructed in a filter type manner to allow passage of clear water and restrain residual sludge particles, and a funnel-shaped section lower section for thickening sludge;
    a soil pipe arranged in the container to extend in a longitudinal direction and opening into the container through an inlet opening for introducing the waste water flow falling through the soil pipe; and
    a removal opening formed at a lower end of the funnel-shaped section for removing separated sludge particles from the container, characterized by a baffle arranged in proximally to the inlet opening, by which the waste water flow is deflected,
    characterized in that
    the soil pipe is guided such that it is longitudinally displaceable with respect to the container and is fixable with respect to the same, and
    a guiding member is arranged in the soil pipe and extending in the longitudinal direction of the soil pipe, to which spacer elements located between the soil pipe and the guiding member are assigned and which guides the sliding movement of the soil pipe relative to the container, and which carries the baffle and is longitudinally displaceable with respect to the container and the soil pipe and fixable with respect to the soil pipe.

2. The device according to claim 1, characterized in that the soil pipe is fixable in such that the inlet opening can be arranged merely above the funnel-shaped section.

3. The device according to claim 1, characterized in that the guiding member is configured as a guide pipe extending into a lower portion of the funnel-shaped section.

4. The device according to claim 3, characterized by a guide pipe guide arranged in the lower portion of the funnel-shaped section.

5. The device according to claim 3, characterized in that the guide pipe is connectable to a pressure medium source and the outlet opening of the guide pipe is arranged in the lower portion of the funnel-shaped section.

6. The device according to claim 1, characterized by a reservoir arranged at a lower end of the funnel-shaped section and comprising a removal opening.

7. The device according to claim 6, characterized in that at least one probe for measuring a quantity of separated sludge particles is assigned to the reservoir.

8. The device according to claim 1, characterized in that the container has a smooth continuous container inner wall having an upper end limited by an inwardly projecting collar.

* * * * *